United States Patent [19]

McGarvey

[11] Patent Number: 4,916,476

[45] Date of Patent: Apr. 10, 1990

[54] METHOD AND CIRCUIT FOR CONVERTING A CONVENTIONAL CAMERA INTO AN ELECTRO-OPTICAL CAMERA

[75] Inventor: James E. McGarvey, Rochester, N.Y.

[73] Assignee: Eastman Kodak Company, Rochester, N.Y.

[21] Appl. No.: 311,006

[22] Filed: Feb. 14, 1989

[51] Int. Cl.$^4$ .................. G03B 17/38; G03B 17/56; H04N 5/335
[52] U.S. Cl. .................................. 354/432; 354/75; 354/266; 358/213.11; 358/213.19; 358/909
[58] Field of Search .................. 354/75, 76, 429, 432, 354/266; 358/213.11, 213.19, 213.13, 229, 906, 909, 335

[56] References Cited

U.S. PATENT DOCUMENTS

| | | |
|---|---|---|
| 4,742,369 | 5/1988 | Ishii .................................. 354/76 X |
| 4,805,037 | 2/1989 | Noble et al. ...................... 354/76 X |
| 4,814,811 | 3/1989 | Saito et al. ....................... 354/75 X |
| 4,823,199 | 4/1989 | Sakakibara et al. ............. 358/909 X |
| 4,825,290 | 4/1989 | Iida et al. .......................... 354/76 X |
| 4,829,384 | 5/1989 | Iida et al. .......................... 354/76 X |

Primary Examiner—W. B. Perkey
Attorney, Agent, or Firm—Stephen C. Kaufman

[57] ABSTRACT

Method and circuit for converting a conventional camera into an electro-optical camera. The camera, in accordance with the method and circuit of the present invention, can retain all of its original structural components, for example, lens, viewfinder, exposure control and focus mechanism, and be readily converted to provide an electro-optical capability, as an advantageous alternative to a traditional film-based capability. To this end, the invention features techniques for detecting a camera's function, status and timing, in order to synchronize and initiate the required electro-optical functions.

6 Claims, 4 Drawing Sheets

METHOD AND CIRCUIT FOR CONVERTING A CONVENTIONAL CAMERA INTO AN ELECTRO-OPTICAL CAMERA

BACKGROUND OF THE INVENTION

1. Field Of The Invention

This invention relates to a conventional film-based camera that can be converted into an electro-optical camera.

2. Introduction To The Invention

It is well known that conventional cameras have historically employed film, which may be chemically developed to provide an image. Advances in technology, for example, lens design, shutter release mechanisms, and high resolution film, have significantly enhanced the camera's importance, versatility and quality.

SUMMARY OF THE INVENTION

It is with the intent of further expanding the versatility and quality of the conventional camera, that I have now discovered a method and electrical-circuit for converting a conventional camera so that it can readily provide an electro-optical capability, as well as a film-based capability.

In a first aspect, the present invention provides a method for converting a film-based camera into an electro-optical camera, the camera comprising (a) a film back location that can accept film-based exposures;

(b) a shutter release mechanism that can adopt two modes, namely:
  (i) a first light metering mode; and
  (ii) a second exposure mode for exposing the film in accordance with the light metering mode; and (c) a power supply for powering the shutter release mechanism, and connectable to the shutter release mechanism by way of a camera power line;

said conversion method comprising the steps of:

(A) inserting into the film back location an electro-optical (E-0) device, which E-0 device has a readout/flush stage, and an exposure stage; and (B) connecting a sensing-control circuit between the E-0 device, and the power supply and the camera power line, the sensing control-circuit providing at least one of two initializing operations, namely:
  (1) initializing the E-0 device readout/flush stage when the shutter release mechanism is in the first light metering mode; and
  (2) initializing the E-0 device exposure stage when the shutter release mechanism is in the second exposure mode.

In another aspect, the present invention provides a circuit suitable for use with a conventional camera, comprising (1) an image integrating device for producing an electro optical exposure, and having a first operating stage of reading/flushing out stored contents of the device; and a second operating stage of accumulating an image; and (2) a sensing control circuit connectable in series to the image integrating device;

the image integrating device and the sensing-control circuit being connectable to a source of electrical power and a camera power line to form an electrical system which can adopt at least one of two steady states in response to two modes of the camera, namely:

(i) a first state in which the sensing-control circuit senses, by way of first information on the camera power line, that the camera is in a light metering mode; the sensing-control circuit then initializing the first operating stage of the image-integrating device; and (ii) a second state in which the sensing control circuit senses, by way of second information on the camera power line, that the camera is in an exposure mode; the sensing-control circuit then initializing the second operating stage of the image-integrating device.

The advantages of the method and circuit of the present invention are significant, and include inter alia:

(1) That a conventional camera can now provide electro-optic exposures, yet retain all of the conventional camera's integral structural components, including the original camera lens, viewfinder, exposure control, focus mechanism, etc. In other words, the conventional film based camera, now used as a base for the electro optic capability, remains unaltered.

(2) The electro-optic capability provides a cameraman with different advantages, compared to a film based capability, of:
  (a) being able to transmit information electrically, as opposed to chemically;
  (b) being able to store images directly, for example, on tape or computer disc drive;
  (c) being able to directly process an image, enhance it and/or extract specialized information from it; and/or
  (d) being able to realize very high resolution, digital imagery, e.g., $1024 \times 1280$ pixels

BRIEF DESCRIPTION OF THE DRAWINGS

The invention is illustrated in the accompanying drawings in which.

DETAILED DESCRIPTION OF THE INVENTION

The present invention preferably employs a charge-coupled device (CCD) array for producing the electro-optical exposures, in response to clock instructions from the sensing control circuit. The sensing-control circuit, in turn, preferably comprises a sense resistor connected in series with the camera power line; a means for detecting a first and a second voltage developed across the sense resistor, as the camera adopts its first and second modes; and a central processing unit responsive to the detected first and second voltages, and programmed to initiate flush/readout and expose clock commands, respectively, for conventional operation of the CCD array.

Figure 1:
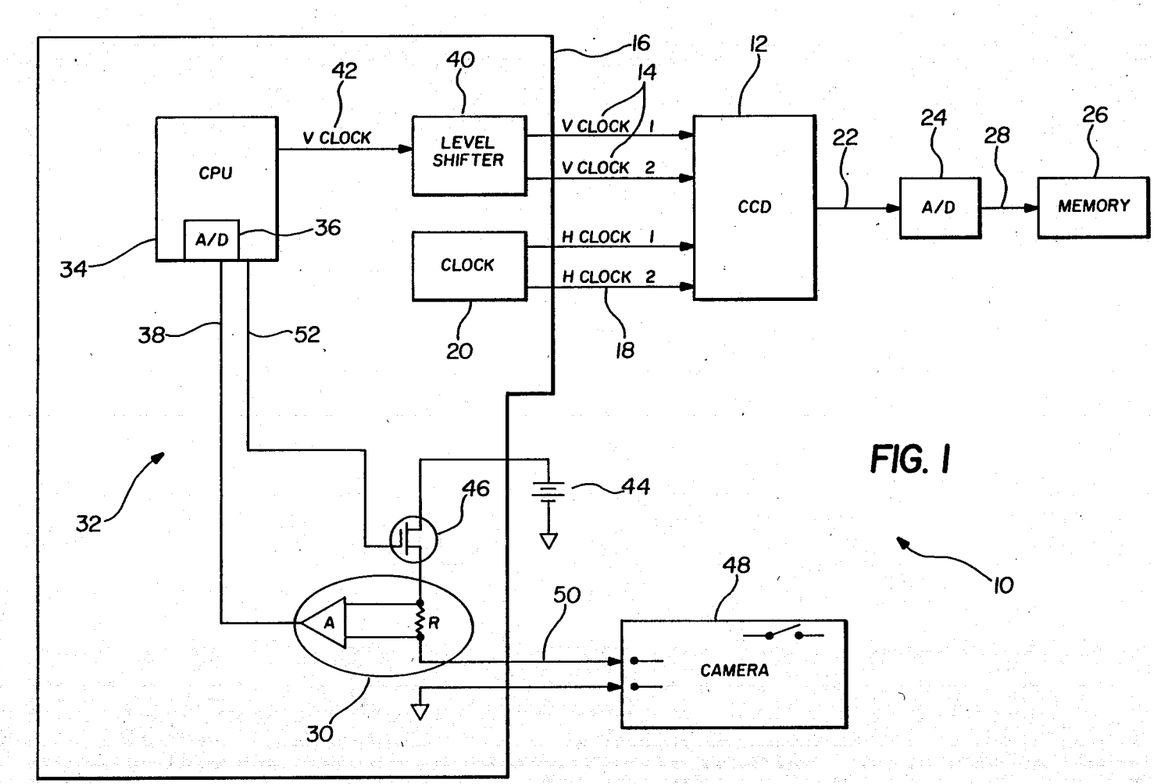
FIGS. 1, 2, 3, 4A, 4B, and 4C illustrate circuits and waveforms of the invention.

Attention is now directed to FIG. 1, which shows a circuit 10 of the present invention. The structure of the circuit 10 will first be disclosed in overview, then in detail, and finally by way of its operation.

In overview, the circuit 10 includes a charge-coupled device (CCD) 12 for producing an electro-optical exposure. The device 12 has a first operating stage of reading/flushing out stored contents of the device; and a second operating stage of accumulating an image. The device 12 can convert from the first to the second operating stage in response to two sets of clock inputs: viz., a first set of vertical clock inputs along a line 14, from a sense control circuit 16, and a second set of horizontal clock inputs, along a line 18 from a conventional clock 20, as detailed below. The device 12 can output its stored contents, along a line 22, to a conventional analog to digital converter 24, and then to a conventional memory 26, along a line 28. A preferred charge-coupled device 12 is available from Eastman Kodak Company Model No. KAF-1400.

As indicated, the charge coupled device 12 responds in part to clock inputs outputted from the sense-control circuit 16. FIG. 1 shows that the sense-control circuit 16, in turn, comprises the following sub-components:

(1) sense electronics 30, comprising a resistor R, followed by a voltage amplifier A, for amplifying a voltage across the resistor R; and (2) control electronics 32, comprising a central processing unit (CPU) 34, for example, an Intel 80C196; a conventional A/D converter 36 for interfacing the output of the voltage amplifier A and the CPU 34 along a line 38; and a level shifter 40, which receives a vertical clock signal from a programmed CPU, along a line 42, and provides the aforementioned first set of vertical clock inputs, along the line 14, to the CCD 12.

The circuit 10 is completed, in overview, by noting that the sense control circuit 16, in particular, the sub component comprising the sense electronics 30, can readily access a conventional camera's electronics. This is preferably accomplished by way of a camera and/or auxiliary power supply circuit 44, including a switch means 46, which power supply circuit 44 can power a camera shutter release mechanism 48, along a camera power line 50.

This accessing of the camera shutter release mechanism 48 - sense electronics 30 is done for the purpose of detecting the camera's function, status and timing, to the end of synchronizing and/or initializing the first and second operating stages of the CCD 12 (i.e., flush-/readout/expose). Now, it is assumed that the shutter release mechanism of a conventional camera can respond to a user-cameraman by adopting at least one of two modes viz., a light metering mode, and a subsequent exposure mode. This action, in turn, results in outputted first and second information along the camera power line 50. The first and second information, so carried by the camera power line 50, may be detected by the sense electronics 30, for subsequent processing by the control electronics 32. This last step, in turn, can provide the necessary input information, along the line 38 to the CPU 34, for coordinating the synchronizing-/initializing action of the CCD 12.

The overview of the circuit 10 of the present invention has now been disclosed. Attention, accordingly, is directed to details of the circuit 10, namely, a preferred level shifter 40, shown in FIG. 2, and a preferred switch means 46 and sense electronics 30, shown in FIG. 3.

Figure 2:
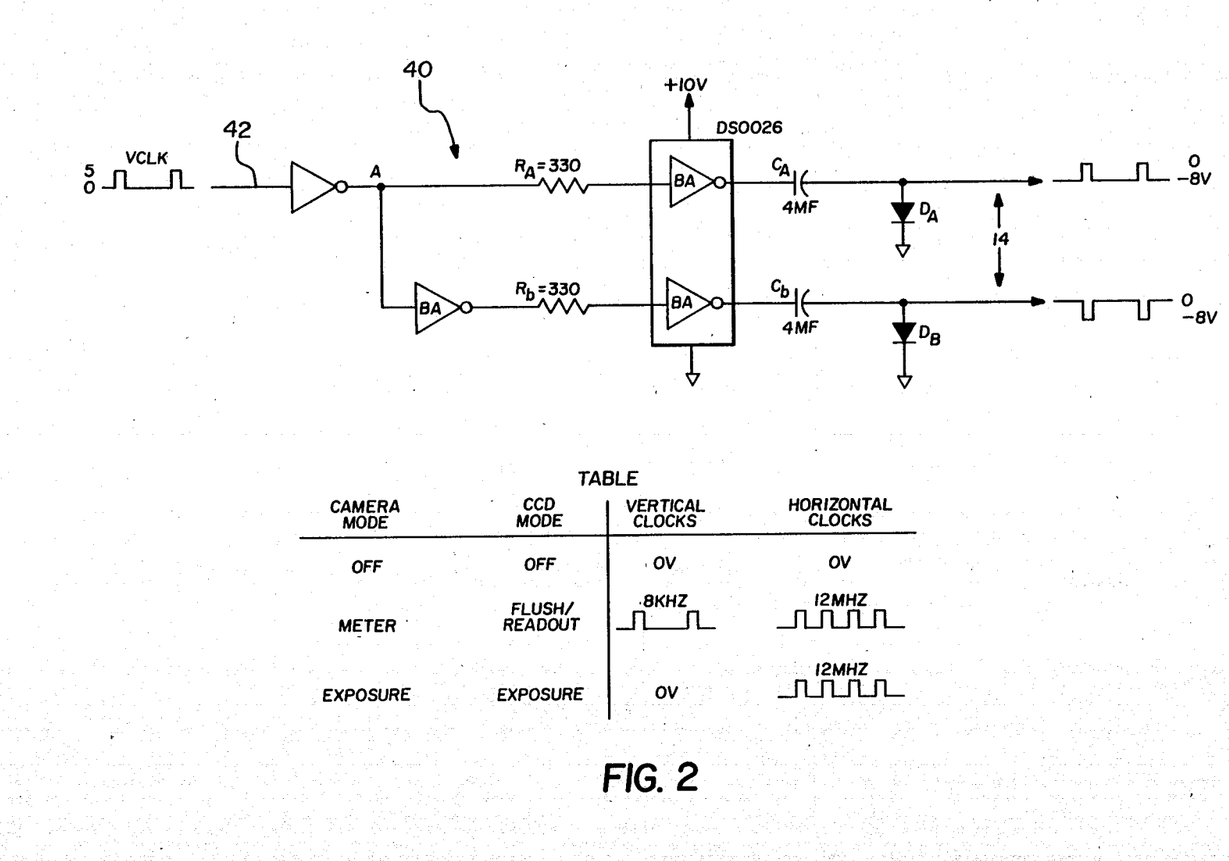

First, recall that the level shifter 40 can receive a vertical clock signal from the CPU 34, along the line 42, and can provide the first set of vertical clock inputs, along the line 14, to the CCD 12. A preferred level shifter 40 for providing this function is shown in FIG. 2. The level shifter 40, in one embodiment, inputs a 5 V, 8K hz square wave (VC1K), and outputs a dual complementary 8 V, 8K hz square wave ($V_1$, $V_2$) for input to the CCD 12. To this end, the FIG. 2 level shifter 40 comprises parallel A and B branches splitting off from node A: the A branch includes a series resistor $R_A$, a buffer amplifier $(BA)_A$, a capacitor $C_A$ and a clamp diode $(D)_A$; the B branch includes a series buffer amplifier $(BA)_{B1}$, a resistor $R_B$, and a second buffer amplifier $(BA)_{B2}$, a capacitor $C_B$, and a clamp diode $(D)_B$. Preferred values and identification of these elements are included in FIG. 2.

Figure 3:
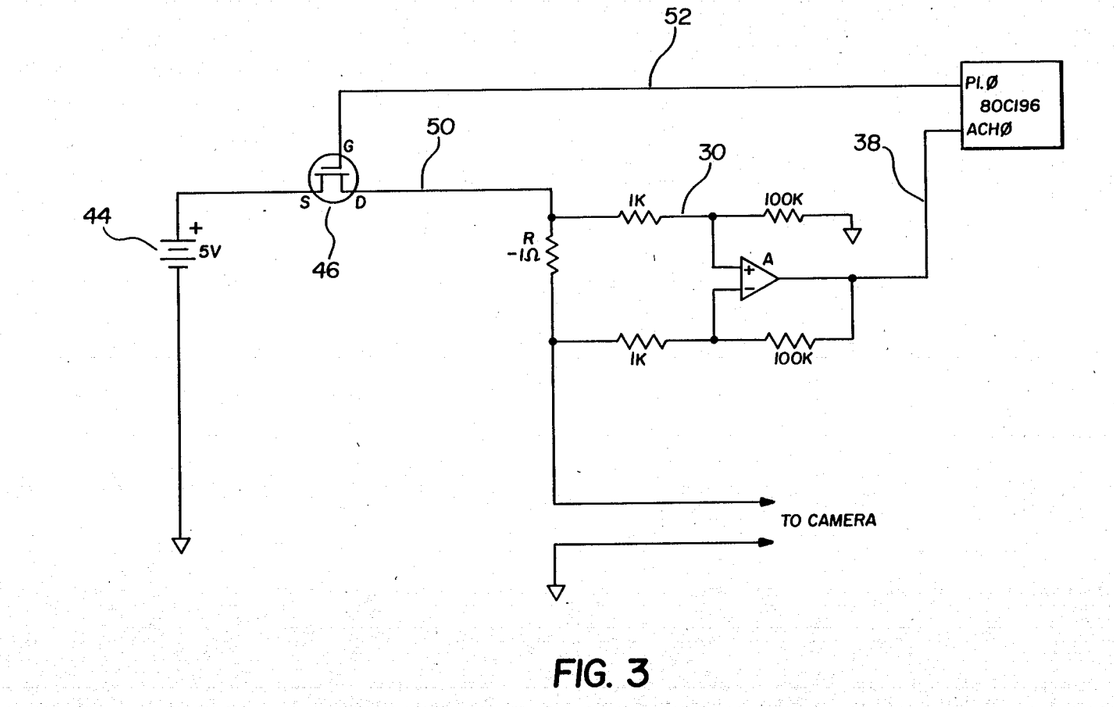

A referred switch means 46 and sense electronics 30 are shown in FIG. 3. The switch means 46 includes an FET capable of operating in a switching mode, and comprising gate, drain and source terminals. The source terminal is connected to the camera power supply 44, as shown, and the drain terminal supplies current to the camera power line 50, in accordance with a voltage applied to the gate terminal by the CPU 34, along a line 52.

The sense electronics 30 detailed in FIG. 3 includes the afore mentioned FIG. 1 operational amplifier A, the resistor R, and further appropriate resistors, as shown. The input to the sense electronics 30 typically is a time varying current, in correspondence to the first and second informations outputted along the camera power line 50, so induced by the cameraman's mechanical manipulation of the shutter release mechanism 48. The sense electronics 30, as its name implies , senses this input current, and amplifies and processes it for suitable input to the A/D converter 36 and CPU 34.

The structure of the circuit 10 has now been described in overview and detail, and attention accordingly is directed to its operation. The waveforms and tables shown in the FIGS. 1-4 may be referred to, to aid in the explanation.

Figure 4A:
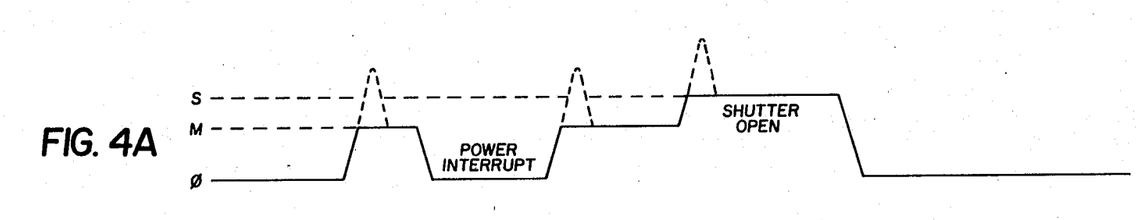
Figure 4B:
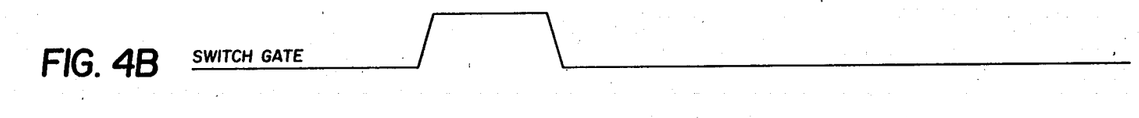
Figure 4C:
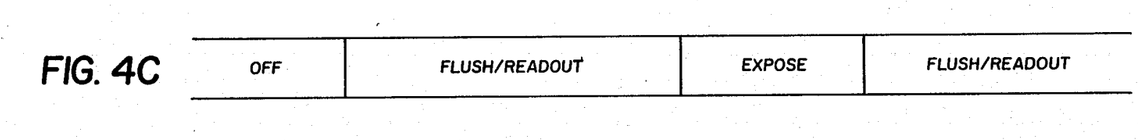

The operation of the circuit 10 typically is commenced when the cameraman mechanically engages the shutter release mechanism 48, so that it is in a light metering mode. It is assumed that the switch means 46 is closed. This action may be sensed by the sense electronics 30 as a first step in FIG. 4a. Note that this first step may have a transient peak, to be disregarded by the sense electronics 30, and a steady state portion centered around a median M (for light metering mode). The steady state portion becomes a first input, by way of the FIG. 1 A/D converter 36, to the CPU 34. The CPU 34 may be programmed (see the illustrative program attached below) to respond to this first input, by synchronizing and/or initiating at least one of the two operating stages of the CCD 12. A response by the CCD 12, the flush stage, is shown in FIG. 4c.

Note that the operation of the CPU 34, to this end, requires (1) the further operation of the FIG. 2 level shifter 40, to provide an appropriate first set of vertical clock inputs to the CCD 12, and (2) a second set of horizontal clock inputs to the CCD 12, from the clock 20 (FIG. 1). The table shown in FIG. 2 indicates the appropriate clock instructions and waveforms for this stage of operation.

I have discovered that it may be advantageous to interrupt the cameramen's traditional ability of being able to directly proceed from the light metering mode, to the subsequent exposure mode, in order to fully realize and insure the CCD 12 flush stage. The interruption may be effected by way of the CPU 34, which can provide a high level logic signal to the FIG. 3 switch means 46 along the line 52, thus opening the switch means 46 for a predetermined time delay. A low level logic signal from the CPU 34 can once again close the switch means 46, in anticipation of coordinating the cameraman's move to the exposure mode. The waveforms produced by the switch means 46 interruptions are shown in FIGS. 4a, b.

The operation of the circuit 10 may be concluded when the cameraman again mechanically engages the shutter release mechanism 48, so that it is in an exposure mode. This action corresponds to a second information on the camera power line 50. This action, additionally, may be sensed by the sense electronics 30 as a second step in FIG. 4a. Note that this second step may have a transient peak, to be disregarded by the sense electronics 30, and a steady state portion centered around a median S (for shutter exposure mode). Note further that the second step has a steady state magnitude which is quantitatively different from the earlier, first steady state step. In fact, the second steady state magnitude is higher (for illustrative purposes). The higher magnitude, steady state portion becomes a second input, by way of the FIG. 1 A/D converter 36, to the CPU 34. The CPU 34, in turn, may be programmed (again, see the illustrative program attached below) to respond to this second input, by synchronizing and initiating the CCD 12 exposure stage. This response by the CCD 12 is shown in FIG. 4c.

Analogous to the operation of the circuit 10 above in the first mode of operation, this last operation of the CPU 34 requires (1) the further operation of the FIG. 2 level shifter 40, to provide an appropriate second set of vertical clock inputs to the CCD 12, and (2) a second set of horizontal clock inputs to the CCD 12, from the clock 20. The table shown in FIG. 2 indicates the appropriate clock instructions and waveforms for this second mode of operation.

Note, finally, as indicated by FIG. 4c, that the readout/flush stages of the CCD 12 are electronically identical in effect, so that the circuit 10 is now immediately ready, if it is desired to repeat, anew, its operation.

Program

The following is an illustrative software program written in PL/M 96 programming language for a micro computer, e.g., the Intel 80C196, referenced above. The Program was specified to convert a Canon F-1 film based camera, so that it could provide an electro optic capability in accordance with the method and circuit of the present invention.

```
/*----------------------------------------------------------*/

CAMERA CONTROL FIRMWARE

/*----------------------------------------------------------*/

DCL   MODE                  BYTE FAST;
        DCL   IMAGE                 BYTE FAST;
        DCL   CAMERA_STATE          BYTE FAST;
        DCL   CAMERA_COUNT          BYTE SLOW;
        DCL   CAMERA_TIME           WORD SLOW;
        DCL   CAMERA_ON             BYTE FAST;
        DCL   CAMERA_SHUTTER_OPEN   BYTE FAST;

/* Modes */
        DCL   OFF                   BYTE DATA ('O');
        DCL   STANDBY               BYTE DATA ('S');
        DCL   FLUSH                 BYTE DATA ('F');
        DCL   EXPOSE                BYTE DATA ('E');
        DCL   TRANSFER              BYTE DATA ('T');

/*----------------------------------------------------------*/

MASTER: PROCEDURE;

CALL INIT_CAMERA;

MODE = STANDBY;
           BFR_IMAGES = 0;

DO FOREVER;

CALL CAMERA;

DO_CASE;

IF MODE = STANDBY
                    THEN DO;
                       IF BFR_IMAGES < 50
```

```
            THEN CAMERA_PWR_DISABLE = FALSE;
            ELSE CAMERA_PWR_DISABLE = TRUE;
        IF CAMERA_ON
          THEN DO;
            MODE = FLUSH;
            CALL START_FLUSH;
            CAMERA_PWR_DISABLE = TRUE;
            CALL WAIT (100000);
            CAMERA_PWR_DISABLE = FALSE;
          END;
      END_DO;

IF MODE = FLUSH
     THEN DO;
        IF CAMERA_SHUTTER_OPEN
          THEN DO;
            MODE = EXPOSE;
            CALL STOP_VCLOCK;
            CALL WAIT (1000);
          END;
          ELSE IF NOT CAMERA_ON
            THEN DO;
              MODE = STANDBY;
              CALL STOP_CLOCKS;

IF BFR_IMAGES < 50
          THEN CAMERA_PWR_DISABLE = FALSE;
          ELSE CAMERA_PWR_DISABLE = TRUE;
     END_DO;

IF MODE = EXPOSE
     THEN DO;
        IF NOT CAMERA_SHUTTER_OPEN
          THEN DO;
            IF BFR_IMAGES >= 49
              THEN CAMERA_PWR_DISABLE = TRUE;
            IF BFR_IMAGES < 50
              THEN DO;
                MODE = TRANSFER;
                BFR_IMAGES = BFR_IMAGES + 1;
                CALL START_IMAGE_XFER;
              END;
              ELSE MODE = FLUSH;
          END;
     END_DO;

IF MODE = TRANSFER
     THEN DO;
        IF IMAGE_XFER_DONE
          THEN DO;
            MODE = FLUSH;
          END;
     END_DO;

END;
```

```
/*------------------------------------------------------------*/

INIT_CAMERA: PROCEDURE;

CAMERA_ON, CAMERA_SHUTTER_OPEN = FALSE;
   CAMERA_STATE, CAMERA_COUNT, CAMERA_TIME = 0;

END INIT_CAMERA;

/*------------------------------------------------------------*/

CAMERA: PROCEDURE;

/* Off:0 Meter:50 Shutter:71 Test:83 Light:97 */

DCL CAMERA_CURRENT BYTE FAST;

DCL  OFF                 LIT '0';
   DCL  METER_ON_SURGE      LIT '1';
   DCL  METER_ON            LIT '2';
   DCL  SHUTTER_OPEN_SURGE  LIT '3';
   DCL  SHUTTER_OPEN_MECH   LIT '4';
   DCL  SHUTTER_OPEN_ELEC   LIT '5';
   DCL  SHUTTER_CLOSE       LIT '6';

AD_COMMAND = 00001000B;
   DELAY;
   DO WHILE BITTST(.AD_RESULT_LO,3);
   END;
   CAMERA_CURRENT = AD_RESULT_HI;

DO CASE CAMERA_STATE;

/* State 0, camera off */

IF CAMERA_CURRENT > 20
        THEN DO;
           CAMERA_STATE = METER_ON_SURGE;
           CAMERA_ON = TRUE;
           CAMERA_COUNT = 0;
        END;

/* State 1, meter on surge */

IF CAMERA_CURRENT < 60
        THEN CAMERA_STATE = METER_ON;

/* State 2, meter on */

IF CAMERA_CURRENT < 15
        THEN DO;
           IF CAMERA_COUNT > 10
             THEN DO;
                CAMERA_STATE = OFF;
                CAMERA_ON = FALSE;
             END;
             ELSE CAMERA_COUNT = CAMERA_COUNT + 1;
        END;
```

```
        ELSE IF CAMERA_CURRENT > 110
          THEN DO;
            CAMERA_STATE = SHUTTER_OPEN_SURGE;
            CAMERA_TIME = TIMER1;
            CAMERA_SHUTTER_OPEN = TRUE;
          END;

/* State 3, shutter opening surge */

IF TIMER1 - CAMERA_TIME > 22500
        THEN DO;
          IF CAMERA_CURRENT < 60
            THEN DO;
              CAMERA_STATE = SHUTTER_OPEN_MECH;
              CAMERA_TIME = TIMER1;
            END;
            ELSE CAMERA_STATE = SHUTTER_OPEN_ELEC;
        END;

/* State 4, shutter open, mechanical timing */

IF TIMER1 - CAMERA_TIME > 37500
        THEN DO;
          CAMERA_STATE = SHUTTER_CLOSE;
          CAMERA_TIME = TIMER1;
        END;

/* State 5, shutter open, electronic timing */

IF CAMERA_CURRENT < 60
        THEN DO;
          CAMERA_STATE = SHUTTER_CLOSE;
          CAMERA_TIME = TIMER1;
        END;

/* State 6, shutter closing */

IF TIMER1 - CAMERA_TIME > 15000
        THEN DO;
          CAMERA_STATE = METER_ON;
          CAMERA_SHUTTER_OPEN = FALSE;
        END;

END;
END CAMERA;

/*--------------------------------------------------------------*/

STOP_CLOCKS: PROCEDURE;

TIMER2 = 100;

END STOP_CLOCKS;
```

```
/*----------------------------------------------------------------*/

START_FLUSH: PROCEDURE;

CALL START_CLOCKS;
    LINE = 1100;

END START_FLUSH;

/*----------------------------------------------------------------*/

STOP_VCLOCK: PROCEDURE;

DO WHILE TIMER2 > 6;
    END;
    IOC2 = IOC2_INIT;

END STOP_VCLOCK;

/*----------------------------------------------------------------*/

START_IMAGE_XFER: PROCEDURE;

CALL START_CLOCKS;
    LINE = 0;

END START_IMAGE_XFER;

/*----------------------------------------------------------------*/

IMAGE_XFER_DONE: PROCEDURE BYTE;

RETURN (LINE >= 1100);

END IMAGE_XFER_DONE;

/*----------------------------------------------------------------*/

START_CLOCKS: PROCEDURE;

TIMER2 = 100;
    IOC2 = IOC2_INIT;
    DISABLE;
    HSO_COMMAND = 11000110B;   /* Store, Horiz Gate = 0 */
    HSO_TIME = 78;
    DELAY;
    HSO_COMMAND = 11100010B;   /* Vert Clock = 1 */
    HSO_TIME = 79;
    DELAY;
    HSO_COMMAND = 11000010B;   /* Vert Clock = 0 */
    HSO_TIME = 80;
    DELAY;
    HSO_COMMAND = 11100001B;   /* Horiz Gate = 1 */
    HSO_TIME = 84;
    DELAY;
```

```
    HSO_COMMAND = 11011110B;    /* Reset Timer 2, Interrupt */
    HSO_TIME = 89;
    ENABLE;
    TIMER2 = 0;

END START_CLOCKS;
```
/*----------------------------------------------------------------*/

What is claimed is:

1. A circuit suitable for use with a conventional camera, comprising:
   (1) an image-integrating device for producing an electro optical exposure, and having a first operating stage of reading/flushing out stored contents of the device; and a second operating stage of accumulating an image; and
   (2) a sensing control circuit connectable in series to the image-integrating device;
   the image integrating device and the sensing-control circuit being connectable to a source of electrical power and a camera power line to form an electrical system which can adopt at least one of two steady states in response to two modes of the camera, namely:
      (i) a first state in which the sensing-control circuit senses, by way of first information on the camera power line, that the camera is in a light metering mode; the sensing-control circuit then initializing the first operating stage of the image-integrating device., and
      (ii) a second state in which the sensing-control circuit senses, by way of second information o the camera power line, that the camera is in an exposure mode; the sensing-control circuit then initializing the second operating stage of the image integrating device.

2. A circuit according to claim 1, wherein the image-integrating device comprises a charge-coupled device array capable of assuming two operating states in response to flush-readout and expose clock commands from the sensing-control circuit.

3. A circuit according to claim 2, wherein the sensing-control circuit comprises
   (a) a sense resistor connected in series with the camera power line;
   (b) means for sensing the first and second informations as the camera adopts its first and second modes, by detecting a first and a second voltage developed across the sense resistor, and
   (c) a central processing unit responsive to said detected first and second voltages, and programmed to initiate flush/readout and expose clock commands, respectively, to the charge-coupled device array.

4. A circuit according to claim 1, further comprising a switch means that, in response to commands from the central processing unit, opens the camera power line.

5. A circuit according to claim 1, further comprising a memory means to store the value of the accumulated image.

6. A method for converting a film-based camera into an electro-optical camera, the camera comprising
   (a) a film back location that can accept film-based exposures;
   (b) a shutter release mechanism that can adopt two modes, namely:
      (i) a first light metering mode; and
      (ii) a second exposure mode for exposing the film in accordance with the light metering mode; and
   (c) a power supply for powering the shutter release mechanism, and connectable to the shutter release mechanism by way of a camera power line;
   said conversion method comprising the steps of:
   (A) inserting into the film back location an electro optical (E-0) device, which E-0 device has a readout/flush stage, and an exposure stage; and
   (B) connecting a sensing-control circuit between the E-0 device, the power supply and the camera power line, the sensing-control circuit providing at least one of two initializing operations, namely:
      (1) initializing the E-0 device readout/flush stage when the shutter release mechanism is in the first light metering mode; and
      (2) initializing the E-0 device exposure stage when the shutter release mechanism is in the second exposure mode.

* * * * *

UNITED STATES PATENT AND TRADEMARK OFFICE
CERTIFICATE OF CORRECTION

PATENT NO. : 4,916,476
DATED : April 10, 1990
INVENTOR(S) : James E. McGarvey

It is certified that error appears in the above-identified patent and that said Letters Patent is hereby corrected as shown below:

Col. 3, line 60    delete "VC1K" and substitute therefor --VCLK--;

Col. 4, line 3     delete "referred" and substitute therefor --preferred--;

Col. 15, line 35   delete "o" and substitute therefor --on--.

Signed and Sealed this

Sixteenth Day of April, 1991

Attest:

HARRY F. MANBECK, JR.

Attesting Officer

Commissioner of Patents and Trademarks